United States Patent
Ueda et al.

(10) Patent No.: US 7,869,950 B2
(45) Date of Patent: Jan. 11, 2011

(54) POSITIONING SYSTEM, POSITIONING METHOD AND CAR NAVIGATION SYSTEM

(75) Inventors: Akihiro Ueda, Toyota (JP); Iwao Maeda, Nagoya (JP); Kiyomi Nagamiya, Nishikamo-gun (JP); Yasuhiro Tajima, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 463 days.

(21) Appl. No.: 12/089,645

(22) PCT Filed: Feb. 15, 2007

(86) PCT No.: PCT/JP2007/052746

§ 371 (c)(1),
(2), (4) Date: Apr. 9, 2008

(87) PCT Pub. No.: WO2007/097245

PCT Pub. Date: Aug. 30, 2007

(65) Prior Publication Data

US 2010/0169006 A1  Jul. 1, 2010

(30) Foreign Application Priority Data

Feb. 20, 2006 (JP) ............................... 2006-042826

(51) Int. Cl.
*G01C 21/00* (2006.01)
(52) U.S. Cl. .................................................. 701/220
(58) Field of Classification Search ................. 701/200, 701/207–208, 213–216, 220, 226; 340/988, 340/990–992, 995.25, 995.28
See application file for complete search history.

(56) References Cited

U.S. PATENT DOCUMENTS 6,025,790 A * 2/2000 Saneyoshi .................... 340/946
6,418,374 B2 * 7/2002 Sakamoto et al. ........... 701/209

FOREIGN PATENT DOCUMENTS

| JP | 61 137009 | 6/1986 |
| JP | 63 247613 | 10/1988 |
| JP | 2 47577 | 2/1990 |
| JP | 2 159590 | 6/1990 |
| JP | 4 164277 | 6/1992 |
| JP | 6 273510 | 9/1994 |
| JP | 7 60175 | 6/1995 |
| JP | 8 75479 | 3/1996 |
| JP | 10 19580 | 1/1998 |

* cited by examiner

*Primary Examiner*—Kim T Nguyen
(74) *Attorney, Agent, or Firm*—Oblon, Spivak, McClelland, Maier & Neustadt, L.L.P.

(57) ABSTRACT

A positioning system 10 includes a positioning unit 15 configured to perform position estimation based on radio signals from artificial satellites and an autonomous navigation unit 14 configured to perform position estimation by autonomous navigation. In the positioning system 10, the positioning unit 15 and the autonomous navigation unit 14 estimate the position of a mobile body in cooperation with each other; and when the number of the artificial satellites available is less than three, the positioning unit determines a point in an area calculated based on the radio signals which point is closest to an inertial-navigation-based position calculated by autonomous navigation, and uses the determined point as a satellite-based position estimated based on the radio signals.

5 Claims, 4 Drawing Sheets

POSITIONING SYSTEM, POSITIONING METHOD AND CAR NAVIGATION SYSTEM

TECHNICAL FIELD

The present invention generally relates to a positioning system, a positioning method, and a car navigation system for estimating the current position of a mobile body based on radio signals from multiple radio stations such as global positioning system (GPS) satellites. More particularly, the present invention relates to a positioning system, a positioning method, and a car navigation system that can accurately estimate the current position of a mobile body even when radio signals are not available from a sufficient number of radio stations.

BACKGROUND ART

There are GPS devices used to detect the current position of a vehicle and to show the user a route to a destination. A GPS device installed in a vehicle receives a carrier wave modulated by a pseudorandom code from a GPS satellite and calculates the distance from the GPS satellite by multiplying light velocity and propagation time of the carrier wave obtained in the demodulation process. The position of a vehicle on the Earth is determined in a three-dimensional space defined by latitude, longitude, and altitude (hereafter, these are simply called coordinates). Therefore, a GPS device receives times of origin from three GPS satellites and obtains the coordinates of the vehicle by calculating an intersection point of spheres each having a radius that is the distance between the vehicle and the corresponding one of the three GPS satellites. Meanwhile, although a GPS satellite is equipped with an extremely high-precision clock, a clock in a vehicle is less precise. Therefore, the obtained propagation time necessarily includes an error and the calculated distance from the GPS satellite becomes inaccurate. To solve or reduce this problem, a GPS device normally uses a fourth GPS satellite to correct a time error and thereby to accurately detect the position of a vehicle.

However, in the case of a GPS device installed in a mobile body such as a vehicle, the GPS device may not always be able to receive radio signals carrying times of origin from all four GPS satellites. In an in-vehicle positioning system, the current position of a vehicle is estimated by autonomous navigation and/or a map matching method when radio signals from GPS satellites are not available. However, the accuracy of the estimated position decreases if GPS satellite signals are not available for a long time.

Patent document 1 discloses a method that enables detection of the position of a vehicle even when a radio signal is only available from one GPS satellite. In the disclosed method, a circle supposedly including the current position of a vehicle is calculated based on a radio signal from a GPS satellite. Also, a current travel direction of the vehicle is obtained by updating the direction of the vehicle with, for example, a gyro sensor. The current position of the vehicle is obtained by calculating an intersection point of the circle and the current travel direction.

[Patent document 1] Japanese Patent Application Publication No. 8-75479

DISCLOSURE OF INVENTION

Problems to be Solved by the Invention

When a radio signal is only available from one GPS satellite, it is only possible to determine that a vehicle is at a certain position on a sphere, with every point on the sphere at an equal distance from the GPS satellite. In this case, if the altitude of the Earth's surface is known, the current position of the vehicle can be obtained by calculating an intersection line of the sphere and the Earth's surface and by calculating an intersection point of the intersection line and the travel direction of the vehicle. However, because the altitude varies from point to point on the Earth's surface, the method disclosed in patent document 1 can be used only if the altitude is known or fixed to be a predetermined value. In other words, with the disclosed method, it is not possible to accurately detect the position of a vehicle without a precise altitude.

Embodiments of the present invention provide a positioning system and a car navigation system that solve or reduce one or more problems caused by the limitations and disadvantages of the related art and that can accurately estimate the position of a mobile body even when radio signals are not available from a sufficient number of GPS satellites.

Means for Solving the Problems

An embodiment of the present invention provides a positioning system including a positioning unit configured to perform position estimation based on radio signals from artificial satellites; and an autonomous navigation unit (e.g., INS unit 14) configured to perform position estimation by autonomous navigation. In the positioning system, the positioning unit and the autonomous navigation unit estimate a position of a mobile body in cooperation with each other; and when the number of the artificial satellites available is less than three, the positioning unit determines a point in an area calculated based on the radio signals which point is closest to an inertial-navigation-based position calculated by the autonomous navigation and uses the determined point as a satellite-based position estimated based on the radio signals.

With this configuration, because a point closest to an inertial-navigation-based position is used as a satellite-based position, it is possible to accurately estimate the position of a vehicle even when the number of GPS satellites available is insufficient.

According to another embodiment of the present invention, when the number of the artificial satellites available is one, the area is defined as a sphere, with every point on the sphere being at an equal distance from the one of the artificial satellites; and when the number of the artificial satellites available is two, the area is defined as a curved line where two spheres intersect, with every point on each of the two spheres being at an equal distance from the corresponding one of the two of the artificial satellites.

This configuration makes it possible to determine a satellite-based position on a sphere or a curved line.

According to still another embodiment of the present invention, the satellite-based position is corrected based on the inertial-navigation-based position calculated by autonomous navigation to estimate the position of the mobile body.

This configuration makes it possible to estimate the position of a mobile body by correcting a satellite-based position based on an inertial-navigation-based position calculated by autonomous navigation even when the number of GPS satellites available is insufficient.

Advantageous Effect of the Invention

Embodiments of the present invention provide a positioning system and a car navigation system that can accurately estimate the position of a mobile body even when radio signals are not available from a sufficient number of GPS satellites.

EXPLANATION OF REFERENCES

Figure 1:
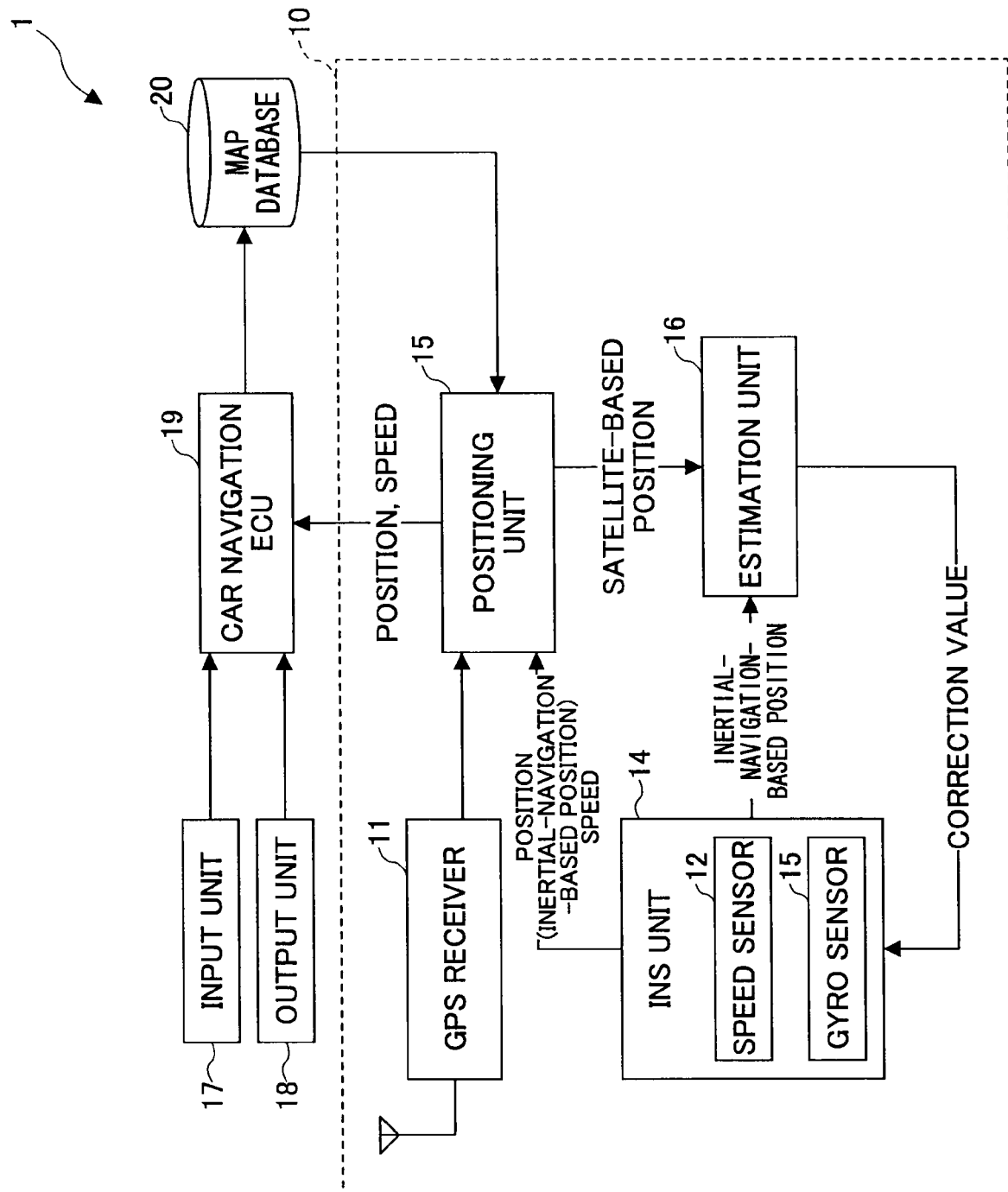
FIG. 1 is a block diagram illustrating a configuration of a car navigation system including a positioning system.

1 Car navigation system
10 Positioning system
11 GPS receiver
12 Speed sensor
13 Gyro sensor
14 INS unit
15 Positioning unit
16 Estimation unit
17 Input unit
18 Output unit
19 Car navigation ECU
20 Map database

BEST MODE FOR CARRYING OUT THE INVENTION

The best mode for carrying out the invention is described based on the following embodiments with reference to the accompanying drawings. FIG. 1 is a block diagram illustrating a configuration of a car navigation system 1 including a positioning system 10 according to an embodiment of the present invention. The car navigation system 1 provides various services to the driver. For example, the car navigation system 1 displays the current position of a vehicle detected by the positioning system 10 on a map or shows a route to a destination based on the detected position.

A car navigation ECU 19 retrieves a road map from a map database 20 based on the current position of a vehicle estimated as described later and displays the retrieved road map on an output unit 18. The output unit is, for example, implemented by a liquid crystal display (LCD), an organic light emitting diode (OLED) display, or a heads-up display (HUD). The output unit 18 is connected to a speaker (not shown) for outputting audio guidance, for example, on the route at an intersection.

An input unit 17 is implemented, for example, by a keyboard, buttons, a remote control, an arrow key, or a touch panel, and is used by the driver as an interface for inputting commands. The car navigation system 1 may also include a microphone for inputting vocal commands and a voice recognition circuit for processing the vocal commands. When searching for a route to a destination, the driver specifies the destination, for example, with an address, a place name, a landmark name, or a postal code.

The car navigation system 1 may further include a TV, a radio, and a media player for playing recording media such as a DVD, which are operated by the input unit 17.

The map database 20 is, for example, stored in a hard disk, a CD-ROM, or a DVD-ROM, and contains road map data defining roads and intersections in relation to latitude and longitude. Specifically, the map database 20 is a tabular database containing road map data where an actual road network is represented by nodes (intersections of roads) and links (roads connecting the nodes).

A node table in the map database 20 contains, for each node, a node number, coordinates, the number of links extending from the node, and link numbers of the links. A link table contains, for each link, a link number, an initial node and a terminal node of the link, and a link length. Node numbers and link numbers are determined so as not to overlap each other. Thus, a road network can be traced by following the node numbers and the link numbers.

Next, the positioning system 10 is described in detail. The positioning system 10 includes a GPS receiver 11 for receiving radio signals from GPS satellites, an inertial navigation system (INS) unit 14 for estimating the position of a vehicle by autonomous navigation, a positioning unit 15 for estimating the position of a vehicle based on radio signals from GPS satellites and on the position estimated by the INS unit 14, and an estimation unit 16 that calculates a correction value by estimating an error in the position estimated by the positioning unit 15. Thus, the positioning system 10 combines a position calculated based on radio signals from GPS satellites and a position calculated by the INS unit 14 to estimate the most probable position of a vehicle.

Meanwhile, multiple GPS satellites (e.g., 24 GPS satellites) are going around the Earth in multiple orbits (e.g., 6 orbits). Approximate orbits of GPS satellites are known and more precise orbits can be obtained from ephemerides in navigation messages transmitted from the GPS satellites. Based on the obtained orbits of GPS satellites, the GPS receiver 11 selects preferably four or more GPS satellites within a predetermined elevation angle from the current position of a vehicle, and receives radio signals from the selected GPS satellites.

Each GPS satellite sends a radio signal generated by modulating a carrier wave L1 having a frequency of 1575.42 MHz with a coarse/acquisition (C/A) code assigned to the GPS satellite. The GPS receiver 11 generates the C/A code for each selected GPS satellite and tries to demodulate the radio signal from the GPS satellite. A C/A code is composed of 1023 bits of "1" and "0". The carrier wave L1 is modulated repeatedly by the C/A code. The GPS receiver 11 adjusts the phase ("1" or "0") of 1023 bits of the generated C/A code in order to demodulate the radio signal, in other words, to capture the radio signal from the GPS satellite.

Assuming that a clock of the GPS satellite and a clock of the GPS receiver 11 are completely synchronized (actually, the clock of the GPS receiver 11 may not always be accurate), the phase of the C/A code of the carrier wave L1 generated by the GPS satellite and demodulated by the positioning system 10, and the phase of the C/A code generated by the positioning system 10 are shifted by an amount corresponding to the travel time of the radio signal.

The positioning unit 15 calculates the travel time of the radio signal based on the amount of shift, and obtains the distance from the GPS satellite based on the calculated travel time and the speed of light c.

Figure 2:
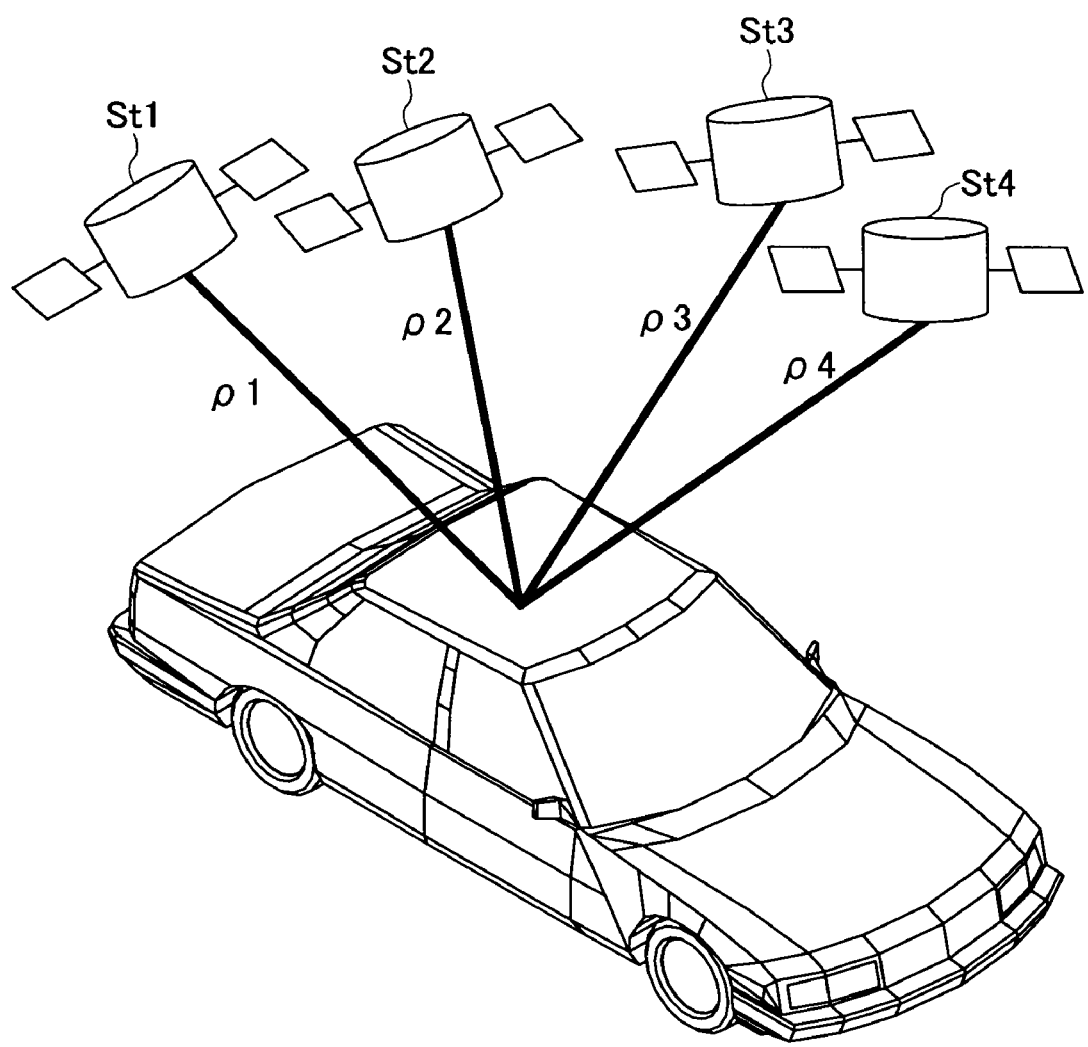
FIG. 2 is a drawing illustrating a relationship between a vehicle and GPS satellites st1 through st4.

FIG. 2 is a drawing illustrating a relationship between a vehicle and GPS satellites st1 through st4. The positioning unit 15 sets up simultaneous equations as described below, solves the equations for variables (X, Y, and Z), and thereby obtains latitude X, longitude Y, and altitude Z of a vehicle (hereafter, coordinates of a vehicle estimated based on GPS satellite signals are called satellite-based coordinates).

In the equations below, X1, Y1, and Z1 indicate coordinates of the GPS satellite st1; X2, Y2, and Z2 indicate coordinates of the GPS satellite st2; and X3, Y3, and Z3 indicate coordinates of the GPS satellite st3. The coordinates of the GPS satellites st1 through st3 can be obtained from their ephemerides. Therefore, the position of a vehicle, or three variables, can be obtained by using three GPS satellites. Solving the simultaneous equations is to obtain an intersection point of surfaces of three spheres each having a GPS satellite at its center, which intersection point is used as the satellite-based coordinates of a vehicle.

Distance $\rho 1$ from GPS satellite $st1 =$
$\sqrt{\{(X1-X)^2+(Y1-Y)^2+(Z1-Z)^2\}}$ Distance $\rho 2$ from GPS satellite $st2 =$
$\sqrt{\{(X2-X)^2+(Y2-Y)^2+(Z2-Z)^2\}}$ Distance $\rho 3$ from GPS satellite $st3 =$
$\sqrt{\{(X3-X)^2+(Y3-Y)^2+(Z3-Z)^2\}}$ When the time error of the clock of the GPS receiver 11 is $\Delta t$, a correct distance from each GPS satellite can be obtained by adding "light speed $c \times \Delta t$" to the result of each equation. In this case, the number of variables becomes four including $\Delta t$, and therefore four GPS satellites are necessary to obtain the position of a vehicle.

Also, the relative velocity of the vehicle with respect to each GPS satellite can be obtained by differentiating the distance $\rho$ of the GPS satellite with time, and the speed of the vehicle can be obtained from the relative velocity. Alternatively, the speed of a vehicle may be obtained based on the Doppler shift of the carrier wave L1. The Doppler shift is proportional to the difference between the speed of a vehicle and the speed of a GPS satellite. Therefore, the speed of a vehicle can be obtained based on the known speed of a GPS satellite and the Doppler shift. The Doppler shift can be calculated based on the change in the frequency of the carrier wave L1.

As described above, using three or more GPS satellites is preferable to accurately detect the position of a vehicle. However, an embodiment of the present invention provides a positioning system that can accurately estimate the position of a vehicle even when less than three GPS satellites are available.

The coordinates obtained from the above simultaneous equations are based on a reference frame called the world geodetic system (WGS). The positioning unit 15 converts the obtained coordinates into the earth-fixed orthogonal coordinate system. In the present application, the position of a vehicle represented by the converted coordinates is called a satellite-based position.

The positioning unit 15 is connected to a speed sensor 12 and a gyro sensor 13 of the INS unit 14. The speed sensor 12, for example, detects pulses, i.e., changes in magnetic flux caused when protrusions, which are disposed at regular intervals along the circumference of a rotor of each wheel, pass through a detector, and measures the speed of the vehicle based on the number of pulses per unit time.

The gyro sensor 13 is a yaw rate sensor, such as a fiber-optic gyroscope or a vibratory gyroscope, that detects the angular speed of the rotation of a vehicle and obtains the angle or the traveling direction of the vehicle by integrating the detected angular speed. The gyro sensor 13 is preferably capable of detecting a three-axis direction or a three-dimensional direction of a vehicle.

The INS unit 14 estimates the current position of a vehicle by autonomous navigation, i.e., by updating the satellite-based position of the vehicle based on the travel distance obtained by the speed sensor 12 and the traveling direction obtained by the gyro sensor 13 (hereafter, the position of a vehicle estimated by autonomous navigation is called an inertial-navigation-based position).

In other words, the positioning unit 15 can estimate the current position of a vehicle based on the speed and direction of the vehicle detected by the INS unit 14 by autonomous navigation even when no radio signal is available from GPS satellites.

The satellite-based position and the inertial-navigation-based position are input into the estimation unit 16. Based on the input positions and previously detected positions, the estimation unit 16 estimates errors in the input positions and thereby calculates a correction value for the inertial-navigation-based position. The correction value for the inertial-navigation-based position is input into the INS unit 14. The INS unit 14 corrects the inertial-navigation-based position with the correction value and outputs the corrected inertial-navigation-based position to the positioning unit 15.

The estimation unit 16 calculates the correction value for the inertial-navigation-based position using, for example, the Kalman filter. The Kalman filter is an algorithm that estimates a most provable value from a measured value(s) including noise. The Kalman filter calculates a correction value so as to minimize the mean square error of an estimate obtained by processing inertial-navigation-based positions input in succession. Thus, the INS unit 14 accurately corrects the inertial-navigation-based position and outputs the corrected inertial-navigation-based position to the positioning unit 15.

Alternatively, the estimation unit 16 may be configured to estimate an error in the inertial-navigation-based position based on the input satellite-based position. In this case, the estimation unit 16 may be configured to correct the satellite-based position based on atmospheric conditions and/or the elevation angle when four or more GPS satellites are available, and to estimate an error in the inertial-navigation-based position estimated by the INS unit 14 based on the corrected satellite-based position.

Meanwhile, in this embodiment, the estimation unit 16 is configured not to estimate an error in the satellite-based position, or configured to estimate an error in the satellite-based position but not to input a correction value for the satellite-based position to the positioning unit 15. The Kalman filter is designed to estimate an error based on the tendency of previous measurements, and is therefore not suitable to estimate an error in the satellite-based position that is an instantaneously detected value. For example, if radio signals from GPS satellites are displaced greatly because of, for example, multipath transmission, the Kalman filter has to calculate correction values based on a satellite-based position having a large error for a substantial period of time after the displacement occurs. Therefore, in terms of accuracy of the satellite-based position, it is preferable not to correct the satellite-based position using a correction value obtained by the Kalman filter.

When three or more GPS satellites are available, even with a time error of the clock of the GPS receiver 11 (when the number of available GPS satellites is three), the position of a vehicle can be accurately estimated by obtaining a satellite-based position of the vehicle in a three-dimensional space based on radio signals from the GPS satellites and by correcting the obtained satellite-based position by autonomous navigation provided by the INS unit 14.

Figure 3A:
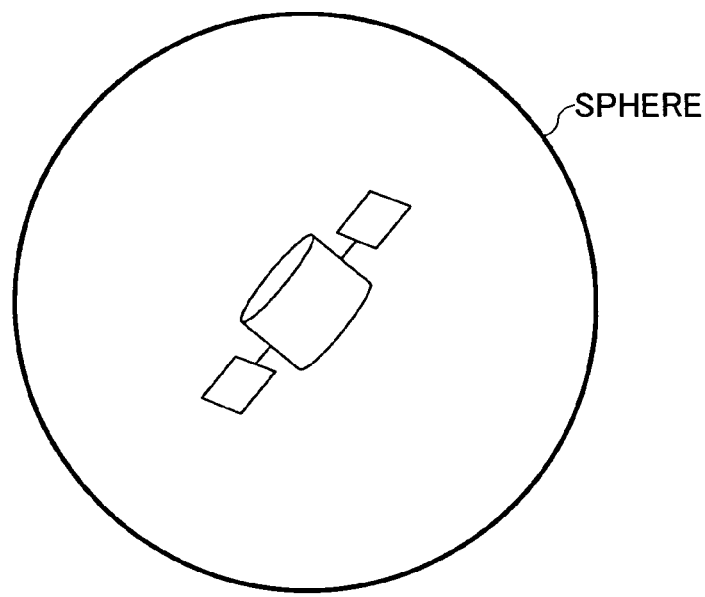
FIG. 3A is a drawing illustrating an area that can be identified when one GPS satellite is available.
Figure 3B:
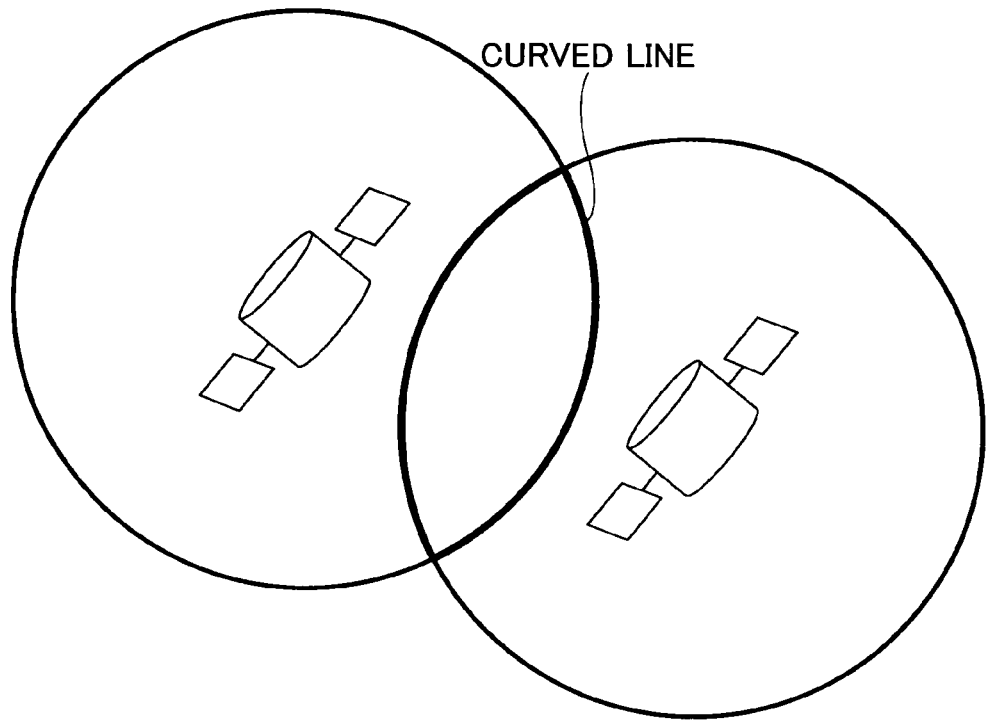
FIG. 3B is a drawing illustrating an area that can be identified when two GPS satellites are available.

However, when less than three GPS satellites are available, only a broad area including a vehicle position can be determined based on the distances from the GPS satellites. FIG. 3A is a drawing illustrating an area that can be identified when one GPS satellite is available, and FIG. 3B is a drawing illustrating an area that can be identified when two GPS satellites are available. When only one GPS satellite is available, it is only possible to determine that a vehicle is at a certain position on a sphere, with every point on the sphere being at an equal distance from the GPS satellite. When only two GPS satellites are available, it is only possible to determine that a vehicle is at a certain position on a curved line where two spheres around the respective GPS satellites intersect, every point on the curved line being at an equal distance from the two GPS satellites.

When less than three GPS satellites are available, the positioning system 10 of this embodiment determines a point in an area (defined as a sphere or a curved line) calculated based on the radio signals which point is closest to an inertial-navigation-based position obtained by autonomous navigation, and uses the determined point as a satellite-based position.

Figure 4:
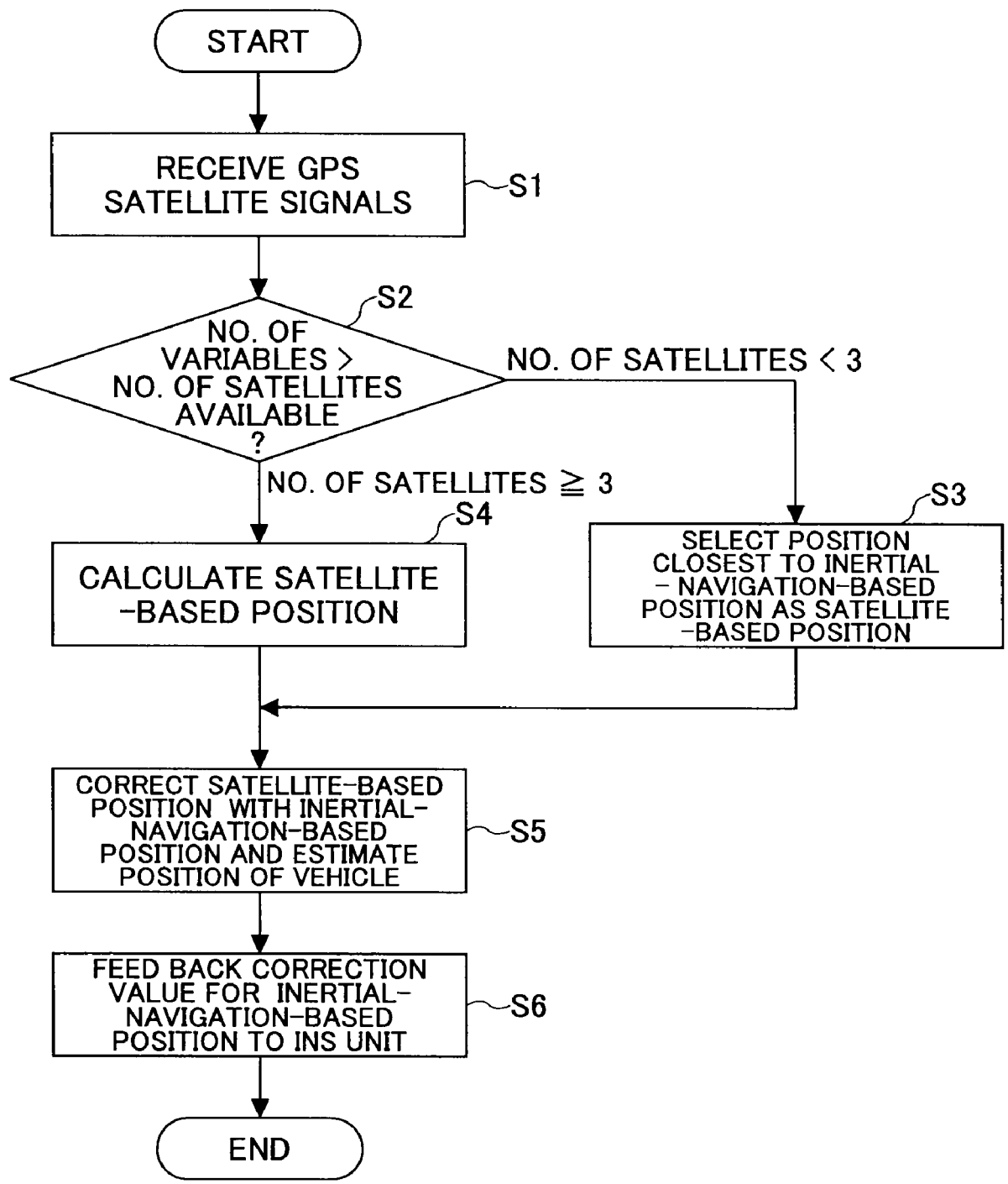
FIG. 4 is a flowchart showing an exemplary process of estimating the position of a vehicle by a positioning system.

An exemplary process of estimating the position of a vehicle by the positioning system 10 is described below with reference to a flowchart of FIG. 4. First, the GPS receiver 11 tries to receive radio signals from GPS satellites (S1). If no GPS satellite is available, autonomous navigation by the INS unit 14 is continued.

If radio signals from GPS satellites are received, the positioning unit 15 compares the number of available GPS satellites and the number of variables necessary to calculate the position of a vehicle by the simultaneous equations described above (S2). As described above, four variables are necessary to correct even the time error of a clock, and three variables are necessary when the time error of a clock is corrected by a different method. In this embodiment, it is assumed that the number of variables is three. If the number of available GPS satellites is less than three, the process goes to step S3; and if the number of available GPS satellites is three or more, the process goes to step 4.

If the number of available GPS satellites is three or more, the positioning unit 15 calculates a satellite-based position based on distances from the three or more GPS satellites (S4).

If the number of available GPS satellites is less than three, the positioning unit 15 determines a position on a sphere or a curved line as shown in FIGS. 3A and 3B which position is closest to an inertial-navigation-based position obtained by the INS unit 14, and uses the determined position as a satellite-based position (S3).

Then, the positioning unit 15 corrects the satellite-based position with the inertial-navigation-based position as in a normal position estimating process, and thereby estimates the position of the vehicle (S5). The positioning unit 15 may be configured to more accurately determine the position of a vehicle by mapping the estimated position of the vehicle onto a road map in the map database 20. The estimated position of the vehicle is sent to the car navigation ECU 19.

Also, the estimation unit 16 estimates a true value of the inertial-navigation-based position and feeds back a correction value for the inertial-navigation-based position to the INS unit 14 (S6).

Thus, according to an embodiment of the present invention, when less than three GPS satellites are available, a positioning system selects a satellite-based position closest to an inertial-navigation-based position from possible satellite-based positions defined as a sphere or a curved line, corrects the selected satellite-based position by autonomous navigation, and thereby estimates the position of a vehicle. This configuration makes it possible to accurately estimate the position of a vehicle even when only one or two GPS satellites are available. According to another embodiment of the present invention, the inertial-navigation-based position is corrected by the estimation unit 16. This configuration further improves the accuracy of the selected satellite-based position that is closest to the inertial-navigation-based position.

Although the above embodiments of the present invention are described using a vehicle, the present invention may also be applied to a positioning system for estimating the position of other mobile bodies such as a ship and an aircraft. Further, although GPS satellites are used as radio stations in the above embodiments, radio stations on the ground may also be used.

The present invention is not limited to the specifically disclosed embodiments, and variations and modifications may be made without departing from the scope of the present invention.

The present international application claims priority from Japanese Patent Application No. 2006-042826 filed on Jun. 20, 2006, the entire contents of which are hereby incorporated herein by reference.

The invention claimed is:

1. A positioning system, comprising:
   a positioning unit configured to perform position estimation based on radio signals from artificial satellites; and
   an autonomous navigation unit configured to perform position estimation by autonomous navigation; wherein
   the positioning unit and the autonomous navigation unit are configured to estimate a position of a mobile body in cooperation with each other; and
   when the number of the artificial satellites available is less than three, the positioning unit is configured to determine a point in an area calculated based on the radio signals which point is closest to an inertial-navigation-based position calculated by the autonomous navigation and to use the determined point as a satellite-based position estimated based on the radio signals.

2. The positioning system as claimed in claim 1, wherein
   when the number of the artificial satellites available is one, the area is defined as a sphere, with every point on the sphere being at an equal distance from the one of the artificial satellites; and
   when the number of the artificial satellites available is two, the area is defined as a curved line where two spheres intersect, with every point on each of the two spheres being at an equal distance from the corresponding one of the two of the artificial satellites.

3. The positioning system as claimed in claim 1, further comprising:
   an estimation unit configured to calculate a correction value for the inertial-navigation-based position from previous values of the inertial-navigation-based position; wherein
   the autonomous navigation unit is configured to correct the inertial-navigation-based position based on the correction value calculated by the estimation unit; and
   the positioning unit is configured to determine the point in the area which point is closest to the corrected inertial-navigation-based position and to use the determined point as the satellite-based position.

4. A positioning method using a positioning unit for performing position estimation based on radio signals from artificial satellites and an autonomous navigation unit for performing position estimation by autonomous navigation, where the positioning unit and the autonomous navigation unit estimate a position of a mobile body in cooperation with each other, the positioning method comprising the steps of:
   determining, by the positioning unit, whether the number of the artificial satellites available is less than three; and determining, by the positioning unit, a point in an area calculated based on the radio signals which point is closest to an inertial-navigation-based position calculated by the autonomous navigation and using the determined point as a satellite-based position estimated based on the radio signals when the number of the artificial satellites available is less than three.

5. A car navigation system capable of displaying a road map together with a position of a vehicle which position is estimated by the positioning system of any one of claims 1 through 3.

* * * * *